March 2, 1971  E. H. CHADWICK  3,566,603
CABLE DRAG CHAINS

Filed July 2, 1968  9 Sheets-Sheet 1

EVERARD HAMILTON CHADWICK,
Inventor

BY Wadsworth, Laird + Ponack.
Attorneys

March 2, 1971  E. H. CHADWICK  3,566,603
CABLE DRAG CHAINS
Filed July 2, 1968  9 Sheets-Sheet 3
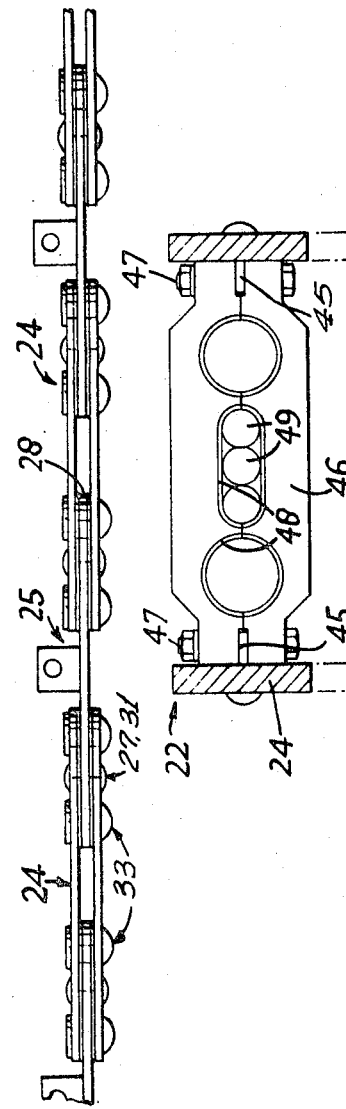
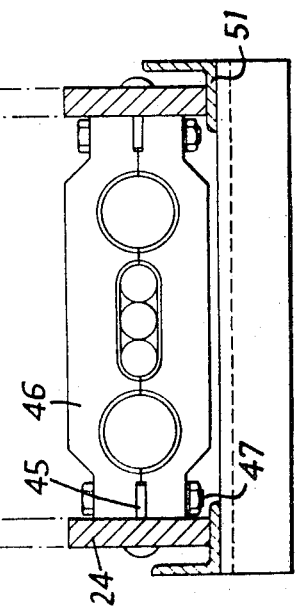
EVERARD HAMILTON CHADWICK,
Inventor
BY. Wenkroth, Lind & Ponack
Attorneys March 2, 1971  E. H. CHADWICK  3,566,603
CABLE DRAG CHAINS
Filed July 2, 1968  9 Sheets-Sheet 4
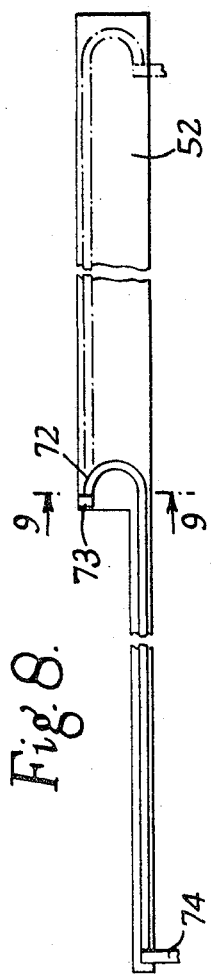
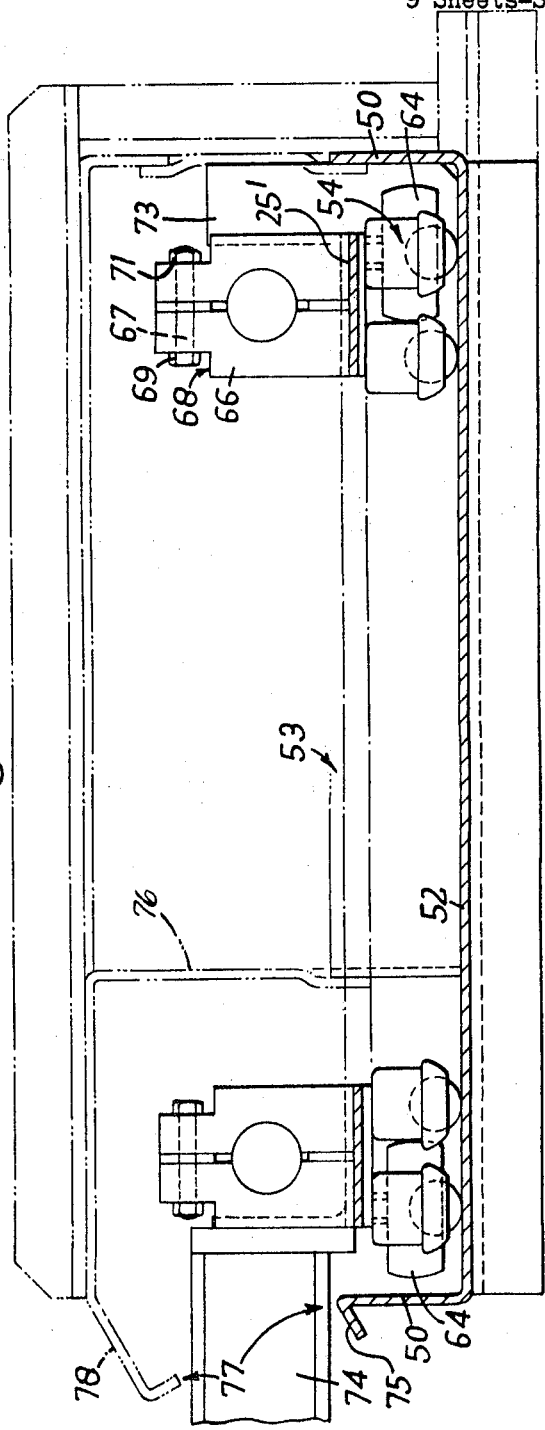
EVERARD HAMILTON CHADWICK,
Inventor
BY Wenderoth Lind & Ponack
Attorneys March 2, 1971   E. H. CHADWICK   3,566,603
CABLE DRAG CHAINS
Filed July 2, 1968   9 Sheets-Sheet 5
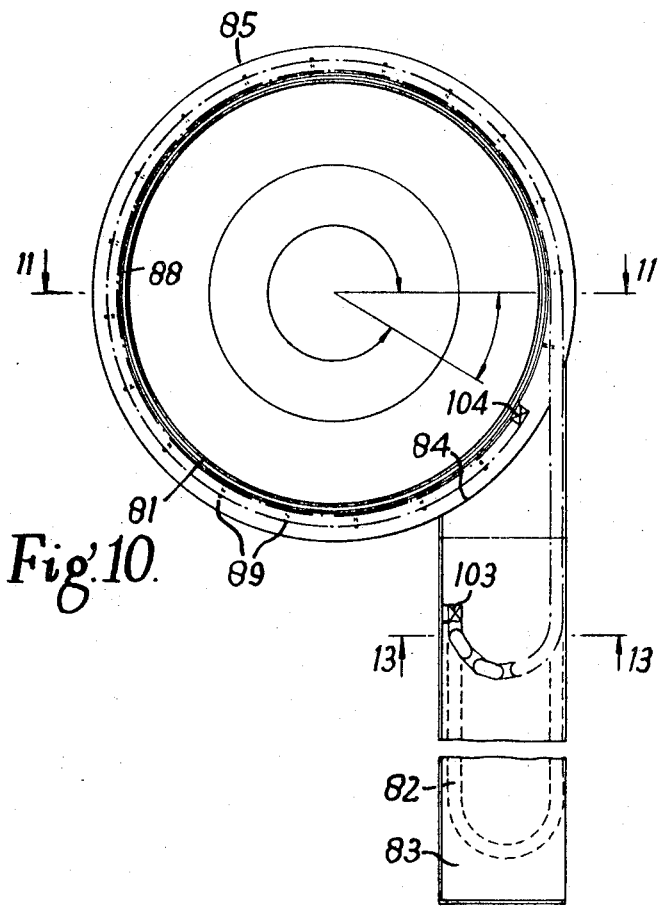
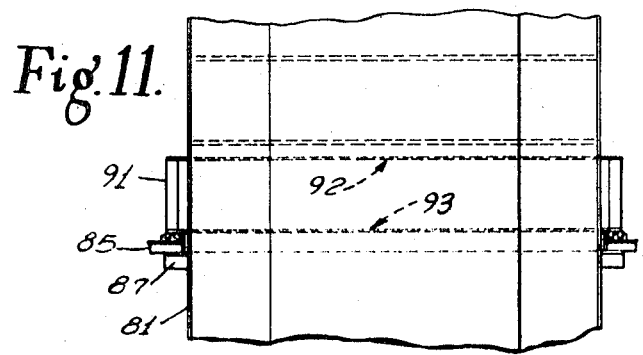
EVERARD HAMILTON CHADWICK,
Inventors
BY Wendroth, Lind & Ponack.
Attorneys

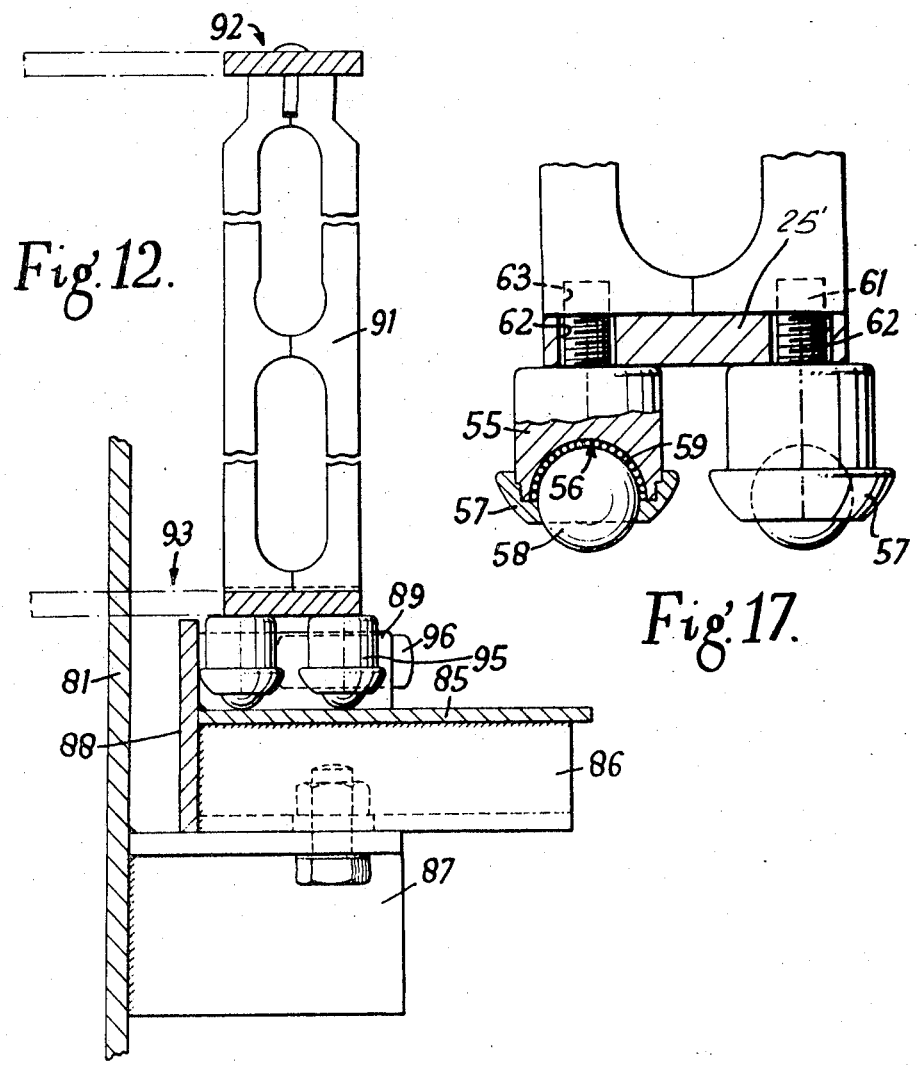

March 2, 1971  E. H. CHADWICK  3,566,603
CABLE DRAG CHAINS
Filed July 2, 1968  9 Sheets-Sheet 7
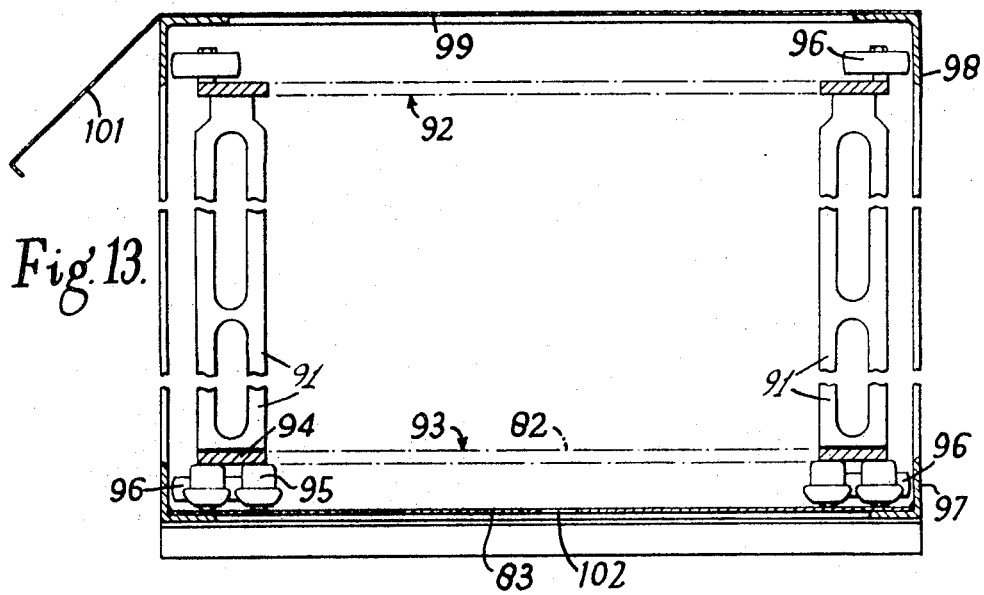
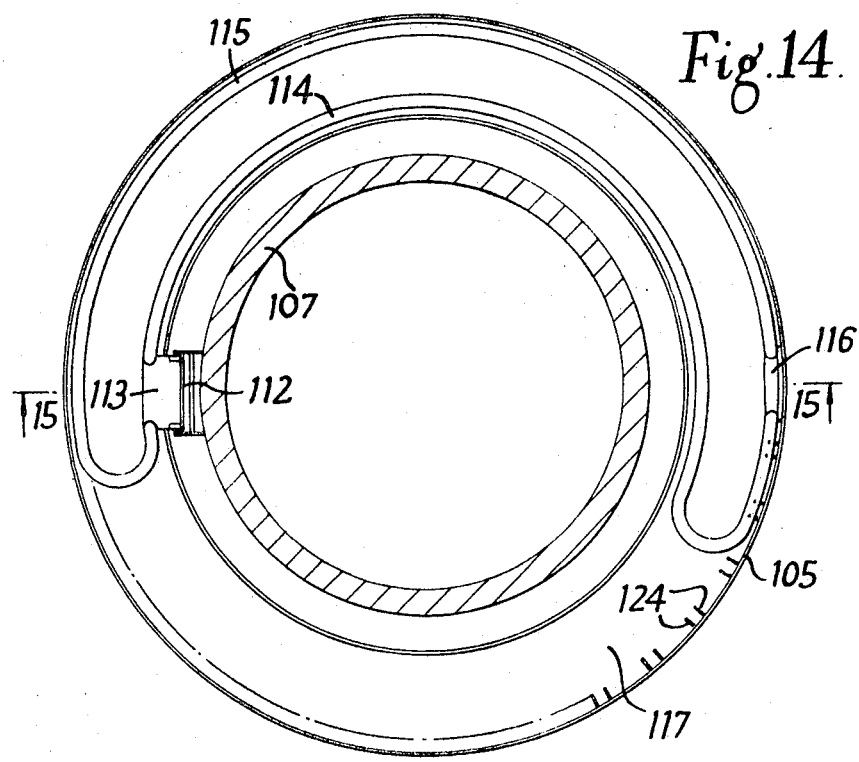
EVERARD HAMILTON CHADWICK,
Inventor
BY Wendroth, Lind & Ponack,
Attorneys

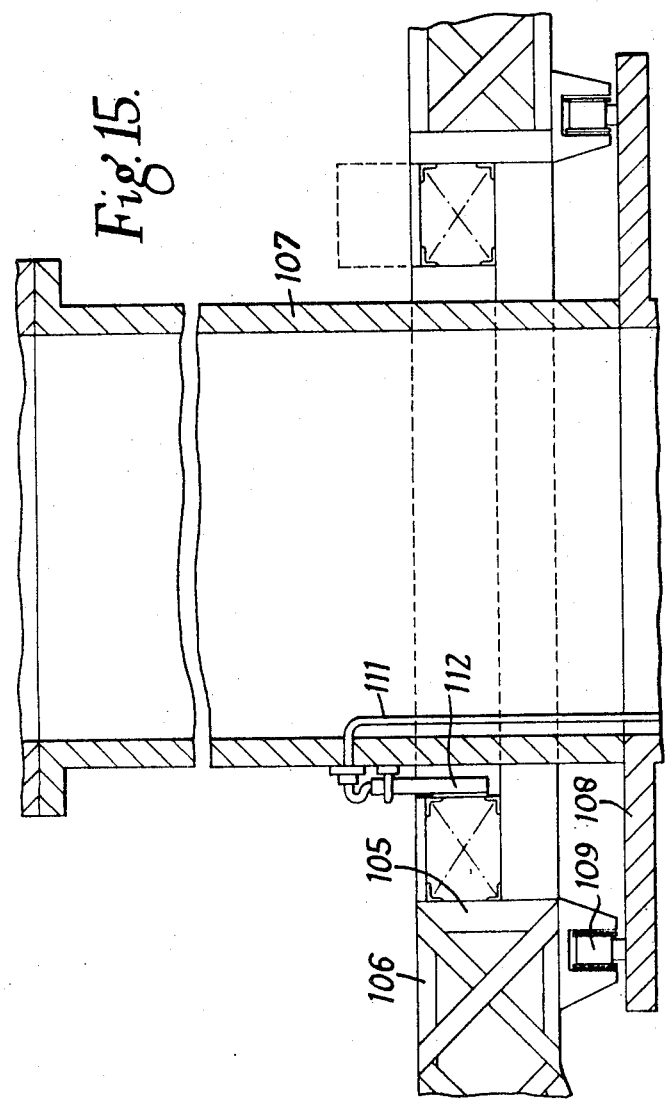

United States Patent Office 3,566,603
Patented Mar. 2, 1971

3,566,603
CABLE DRAG CHAINS
Everard Hamilton Chadwick, Arnold, England, assignor to Cable Equipments Limited, Nottingham, England
Filed July 2, 1968, Ser. No. 741,977
Int. Cl. F16g *13/16*
U.S. Cl. 59—78.1     13 Claims

ABSTRACT OF THE DISCLOSURE

This disclosure relates to drag chains for guiding cables from a fixed supply point to a movable point of utilization. The drag chain comprises alternate pairs of link plates and single link plates which are pivoted together. The link plates are pivotable about a ball-bearing. Stop pins held by the pair of link plates are slidable in arcuate slots in the single link plates and limit the angle through which the links can pivot relative to one another. A nylon anti-friction pressure pad is provided between facing surfaces of the link plates.

---

This invention relates to cable drag chains. Such drag chains serve to guide water, lubricant, pneumatic, electric or other service cables to a moving member such as the movable head of a grinding machine, a milling machine, an extrusion press, or similar machine tool, to an overhead or swing jib crane or to any other machine having a movable member to which services must be brought. The drag chains prevent cables from being bent through a curve of smaller diameter than can be accommodated by the cables. The cables are also protected by the drag chains against undue tension as they are being moved.

Drag chains are known having two chain sets each comprising a plurality of links each having an extending lug so that the lugs of adjacent links may be pinned together at these lugs and adjacent links having abutting surfaces which limit the amount which the links may pivot relative to one another. Alternate pairs of registering links of the two chain sets are joined by webs which serve as supports for the cables. Such drag chains suffer from the disadvantage that swarf, dirt or dust may fall between the abutting surfaces. This prevents the adjacent links from taking up the correct relative position one to the other. There is also a danger that personnel may have their fingers caught between the abutting surfaces thus necessitating the provision of guard rails or the like in many applications of the drag chains. Still further, it is necessary when making the links to fold over the upper and lower edges to provide sufficiently wide abutment surfaces. This additional step increases the cost of manufacture considerably.

Another known drag chain has each chain set provided with pivoted links. Such links may have a central pivot pin and a pair of arcuate guide slots at or near each end through which guide slots stop pins pass. This provides a complicated, multi-link arrangement requiring a large number of links. The links may have a pivot pin at each end and an arcuate slot adjacent thereto. In yet a further arrangement, two diametrically opposite concentric arcuate guide slots are provided at each end of the link and pins pass through these slots. With such an arrangement as the links approach and leave the in-line position, there is a possibility that the pins will fall in a parallel movement down the slots rather than the links pivoting about the centre of the slots. Also in such arrangements the arcuate guide slots are open to the elements and more seriously to any swarf, dirt or the like which can enter the guide slots and prevent the links pivoting through their full arcuate angle which prevents the drag chain operating efficiently. Also in the second two arrangements at least the ends of the links are not arcuate about the pivot pin so that as the chain bends the edges protrude above the chain providing a danger factor.

Further in all known arrangements there is a metal-to-metal contact between the links. Thus when the drag chain is used out-of-doors the surfaces tend to rust up or in winter to be frozen together by any water which may seep between the links.

It is an object of this invention to provide a drag chain having links with arcuate guide slots that are protected from the ingress of swarf or the like, which are mounted to swing through an arc, which provide protection during outdoor operation and which are relatively economical to manufacture.

According to the present invention there is provided a drag chain having at least one chain set or comprising a plurality of links pivoted together characterised in that alternate links comprise respectively an aligned pair of link plates and a single link plate having its ends pivotally received between the ends of the pair of link plates, the link plates having at each pivotal connection a central pivot, a pair of concentric arcuate slots and stop pins that pass through the slots and that are adapted to engage the ends of the slots to limit the angle through which alternate links may pivot relative to one another. This pivot may comprise a pin passing through aligned slots in the links but preferably comprises a ball-bearing received in an aperture in the single link and located in cups or depressions in the pair of link plates.

According to a preferred feature of the invention the arcuate slots are formed in the single link plate and the stop pins which pass through the arcuate slots are held in position in aligned apertures in the double link plates. With this arrangement the guide slots are protected by the pair of links against the ingress of swarf, dirt and the like.

According to another feature of the invention there may be provided a nylon pressure pad between the facing surfaces of the double and single links.

According to a further feature of the invention the ends of the links may be arcuate, centered on the pivot axis, and of a radius equal to half the width of the links.

Embodiments of the invention will now be described, by ways of example, with reference to the accompanying drawings:

In the drawings:

FIG. 1 is a detail of a "vertical" drag chain of the invention with the cable supports omitted;

FIGS. 2, 3 and 4 are respectively sections on lines 2—2; 3—3 and 4—4 of FIG. 1;

FIG. 6 is a detail view of a chain set in the direction of arrow 6 in FIG. 1 with the cable support omitted for clarity;

FIG. 7 is a section on line 7—7 of FIG. 1 with the cable supports shown;

FIG. 8 is a diagrammatic view of a "horizontal" chain of the invention;

FIG. 9 is a section through a "horizontal" chain of the invention taken at the position indicated at line 9—9 of FIG. 8;

FIG. 10 is a diagrammatic plan of a drag chain system for a swinging jib crane;

FIG. 11 is a section on line 11—11 of FIG. 10;

FIG. 12 is an enlarged detail of FIG. 11;

FIG. 13 is a section on line 13—13 of FIG. 10;

FIG. 14 is a diagrammatic plan of a chain system for a sugar beet refining plant;

FIG. 15 is a section on line 15—15 of FIG. 14;

FIG. 17 is a detail section of a bearing support.

Figure 1:
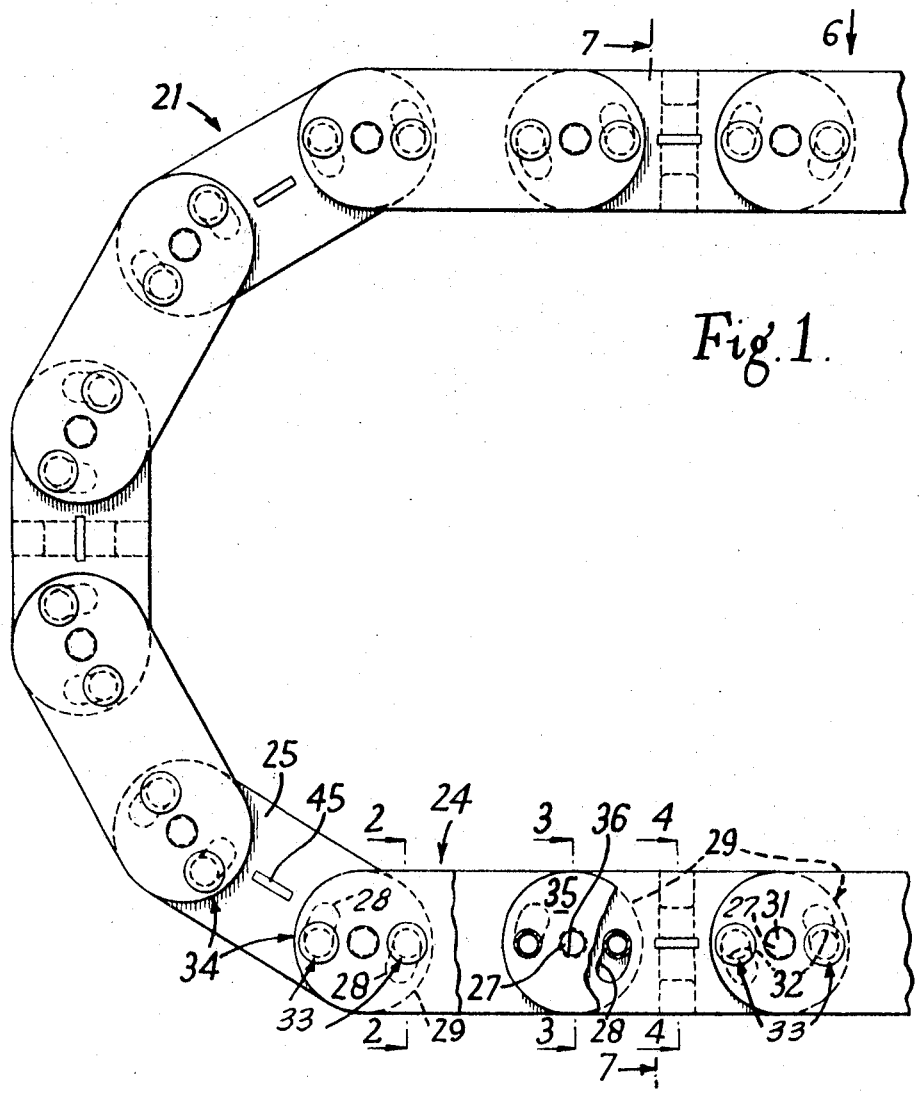

Referring now to FIGS. 1 to 7 there is shown a "vertical" drag chain 21. This drag chain 21 comprises two chain sets 22 (see FIG. 7), the chain links of which are joined by cable supports as will be described. Each chain set 22 comprises links pivoted together. The links are arranged with alternate links formed by a pair of link plates 24 between the ends of which are received single link plate links 25. The link plates 24 and 25 are pressings made from drawn steel and are of the same width and thickness.

The single link plates 25 each have a circular aperture 26 (see FIG. 3) at each end within which is received a hardened steel bearing ball 27. Two short arcuate slots 28 (see FIG. 1) are provided in each link plate 25 concentric with the aperture 26. The end edges 29 of the link plates 25 are arcuate, centered on the center of the aperture 26 and of a radius equal to half the width of the plates 25.

The double link plates 24 each have a domed central recess or cup 31 at each end. A pair of apertures 32 are provided on the longitudinal axis of the link plates 24 at such locations that locking pins 33 which pass through them are slidably received in the arcuate slots 28. The end edges 34 of the plates 24 are also arcuate, centered on the center of the recesses 31 and of a radius equal to half the width of the plates 24.

Located between the ends of the plates 24 and 25 are two nylon anti-friction discs 35 made from "Nylatron" G.S. "Nylatron" is a tradename or trademark of the Polymer Corp. of Reading, Pa. and refers to filled nylons, some of which may be nylon incorporating molybdenum sulphide and graphite lubricant additives. Each disc 35 is of the same radius as the end edges of the link plates 24 and 25 and has a central aperture 36 and two outer apertures 37. The bearing ball 27 projects through the aperture 36 and the pins 33 extend through the apertures 37. The diameter of the apertures 36 is slightly less than the diameter of the ball 27 so that the discs 35 serve to retain the ball 27 in position during assembly of the chain.

Figure 2:
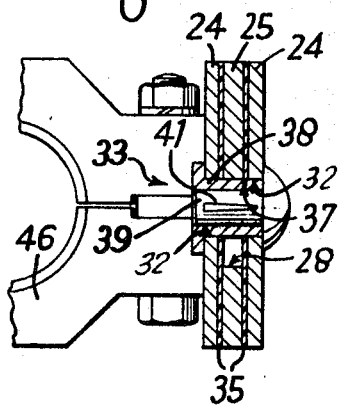
Figure 3:
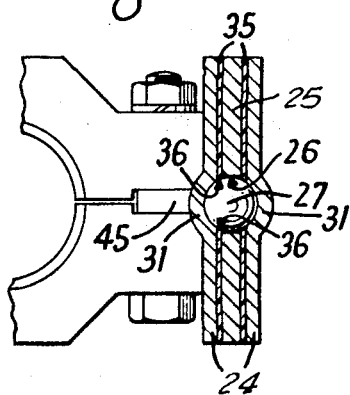
Figure 4:
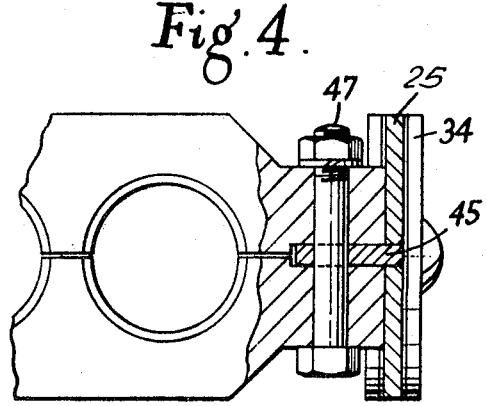
Figure 5:
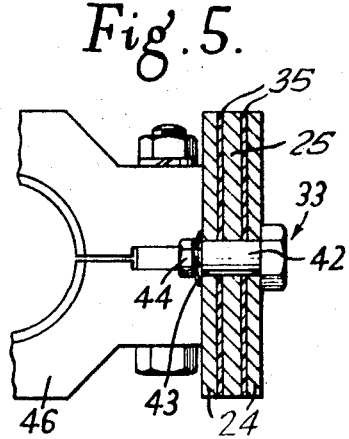
FIG. 5 is a view similar to FIG. 2 of a modification.

The pins 33 may comprise a self-locking collar 38 and rivet 39 arrangement as shown in FIG. 2. Each rivet 39 is provided with tapering spurs 41 which bite into the steel collar 38 to form a firm connection. Alternatively the pins 33 may each comprise a bolt 42 as shown in FIG. 5. The end of the bolt 42 is turned down and a Belleville washer 43 is interposed between the nut 44 screwed on to the turned down end of the bolt 42 and the adjacent side of the link plate 24. This arrangement will accommodate link plates of varying thickness within the normal manufacturing tolerances.

It will be seen that with the arrangement above described, the links 24 and 25 can pivot relative to each other about an axis extending transverse to their thickness about the bearings ball 27. The extent of this pivotal movement is limited by the pins 33 sliding in the arcuate slots 28. In the embodiment illustrated the slots are arranged to enable the links to pivot from an in-line or substantially in-line position to a position at about thirty degrees from the in-line position in one direction only. The arcuate slots 28 are protected against ingress of swarf, dust, dirt and water by the outer link plates 24 and by the nylon discs 35. No edges project from the chain when it is bent and there are no external surfaces which come together to limit the pivotal movement of the links. It will also be seen that individual links can be removed from the chain without undue disturbance of the chain by filing off the heads of the rivets 39 or unscrewing the nuts 44 as the case may be. The replacement links can equally easily be re-introduced into the chain. Further if one pin 33 should fail there will remain the ball about which the links pivot and a second pin to limit the amount of pivoting which takes place.

The single link plates 25 are each provided with an inwardly directed lug 45. A cable support 46 extends between the lugs 45 of aligned links 25 of the two chain sets 22. The cable supports 46 may connect every pair of aligned links 25, every other pair, every third pair or every fourth pair as the characteristics of the cables permit but usually it is every other pair of links 25 that are so connected. Each chain support 46 is formed in two parts which are connected togethed by bolts 47 which also serve to anchor the chain support to the lugs 45. The chain supports 46 have openings 48 therethrough for receiving the cables 49 which are to be carried by chain 21.

The chain arrangement as above described may be used either with a "vertical" system as shown in FIGS. 1 to 7 (i.e. with the link plates vertically disposed and the cable supports extending horizontally) or in a "horizontal" system (i.e. with the link plates horizontally disposed and the cable supports extending vertically) where there is a long chain run or where the chain follows a curved path.

In the "vertical" system the lower run of the chain is normally stationary and rests on a fixed base plate 51 (as shown in FIG. 7). The chain is anchored at its lower end to a fixed member to allow the cables 49 to be introduced into the cable supports 46. The other end of the chain 21 is anchored to the movable member in such a way that the cables 49 may be fixed to the parts which they supply. The lower run of the chain is supported on a base plate 51 with the link plates 24 and 25 resting on the base plate. The upper run is maintained in a straight horizontal condition by the abutment of the pins 33 against the ends of the arcuate slots 28. The abutment of the pins 33 against the other ends of the slots 28 prevents the chain from bending through a smaller radius of curvature than the cables are able to accommodate without damage. The chain is unsupported in both the upper run and in its curved portion.

In the "horizontal" system with the cable supports arranged vertically, normally the chain comprises two chain sets, viz an upper chain set and a lower chain set. The chain is supported over its entire length as will be described. Because of this, one of the chain sets, normally the upper chain set, may be omitted so as to provide a light chain structure as shown in FIGS. 8 and 9. This arrangement, which is suitable for use, for example, in bringing a lubricant cable to the saddle member of a milling machine for long workpieces, is provided with a plane base plate 52 which in plan is in the general shape shown in FIG. 8 and is surrounded by an upstanding peripheral rim 50. This base plate 52 serves as a support and a running track for the chain 53. The chain 53 is carried on the base plate 52 by supporting ball bearings or castors 54, provided on each single link plate 25'. The castors 54 comprise a main body 55 having a hollowed-out recess 56 (see FIG. 17) that is closed by a screwed-on centrally-apertured cap 57. A main ball 58 is received in the recess 56 and projects through the cap aperture. A plurality of considerably smaller ball bearings 59 are received in the recess 56 to minimise the friction between the main ball 57 and the base of the recess. The main body 55 has a bolt 61 fixed thereto and this bolt 61 is threaded, through a bore 62 in the single link plate link 25' carrying the vertical cable support into an internally threaded bore 63 in the cable support.

Each double link plate, or every second or fourth single link plate, as may be desired, carries dependent therefrom a guide roller 64 (FIG. 9) which is rotatable about a vertical axis. This guide roller 64 serves to engage the rim 50 to prevent the chain bowing outwardly and fouling this rim.

In this arrangement, a cable support 66 for a single cable is provided. This cable support 66 is secured to the single link plates 25' in the same way as in the first-described embodiment. At their upper ends, however, the cable supports 66 have a cross bolt 67 to secure the parts together. Edge rebates or notches 68 are provided to receive the bolt head 69 and the securing nut 71 so that these do not project dangerously beyond the sides of the chain.

One end 72 of the chain is secured to a fixed box member 73 welded to the base plate 52. This box member 73 contains the appropriate connector for leading the cable to its source of supply. The other end of the chain carried a movable arm 74. This arm is secured to the movable part of the machine tool so that the cable may be connected to its point of delivery. The peripheral rim 50 along the longer side of the base is bent downwardly at 75 to allow the arm 74 to move freely thereover.

If the above arrangement is intended to be used out of doors, a cover 76, indicated in chain lines, may be provided for the base plate 52 and the chain 53. The cover 76 is canti-levered on the side remote from the arm 74 to provide an elongated opening 77 through which the arm can pass in its reciprocatory movements. A sloping edge or eave 78 is provided to allow any water that falls on the cover to run away.

Referring now to FIGS. 10 to 13, there is shown a cable chain arrangement for use with a swinging jib crane, the rotatable tower of which is shown at 81. The chain 82, which is an "horizontal" chain, is mounted for movement along a fixed base plate 83. The base plate 83 is substantially rectangular with an arcuate cut-out 84 at one end thereof. The base plate 83 is fixed adjacent the tower 81 approximately tangentially thereto and the tower 81 carries an annular track 85 rotatable therewith which fits into the space of the cut-out 84 and the track surface of which is aligned with the surface of the base-plate 83. The track 85 is mounted on the vertical arms of a plurality of angle iron members 86 bolted to support lugs 87 welded to and projecting radially from the tower structure 81. An annular guide 88 runs along the inside of the track 85. No guide is provided on the outside of the track 85 although this may be provided if desired. A number of upstanding radial locating plates 89 are welded to the track 85 for the purpose that will be described.

The chain 82 is intended to carry a number of cables and therefore enlarged cable supports 91 are provided and both upper and lower chain sets 92 and 93 are provided. (See FIG. 13.)

The single link plates 94 are mounted on supporting ball-bearings or castors 95 similar to the ball bearings 54. Spaced links carry guide rollers 96 on both the upper and lower chain sets 92 and 93 so that these engage against the rims 97 and 98 of the base plate 83 and a cover 99 provided therefore. An eave 101 is provided on the open side of the casing formed by the parts 83 and 99 to allow water to drain off the upper side of the casing. An aperture 102 is provided in the base plate 83 to allow any water that may enter the casing to drain away therethrough.

The radial plates 89 are located on the annular track 85 at spacings equal to the spacings between the ball-bearing castors 95. Thus, as the links of the chain 82 lead on to the track 85 these are positively located by the plates 89 to hold the lower chain set links 93 in position alongside the guide 88.

The fixed end of the chain 82 is secured to a box 103 (see FIG. 10) secured to the base plate 83. The movable end of the chain 82 is secured to a box 104 attached to a part of the tower 81. The tower 81 is capable of rotating through 330°. As the tower 81 rotates to its maximum rotational position (as shown in FIG. 10), the links of the chain are drawn on to the annular track 85. Once on this track 85 the links are held by the plates 89 against movement relative to the tower 85. Continued rotation of the tower 81 draws more links on to the track 85. Conversely, rotation of the tower 81 in the reverse direction pushes the links back on to the base plate 83 so that the chain 82 takes up the U-shaped position, as shown in dotted lines in FIG. 10. The engagement of the rollers 96 with the rims 97 and 98 of the base plate 83 and cover 99 respectively and the provision of the plate 89 prevents the chain 82 from following a path other than defined by the track 85.

Figure 16:
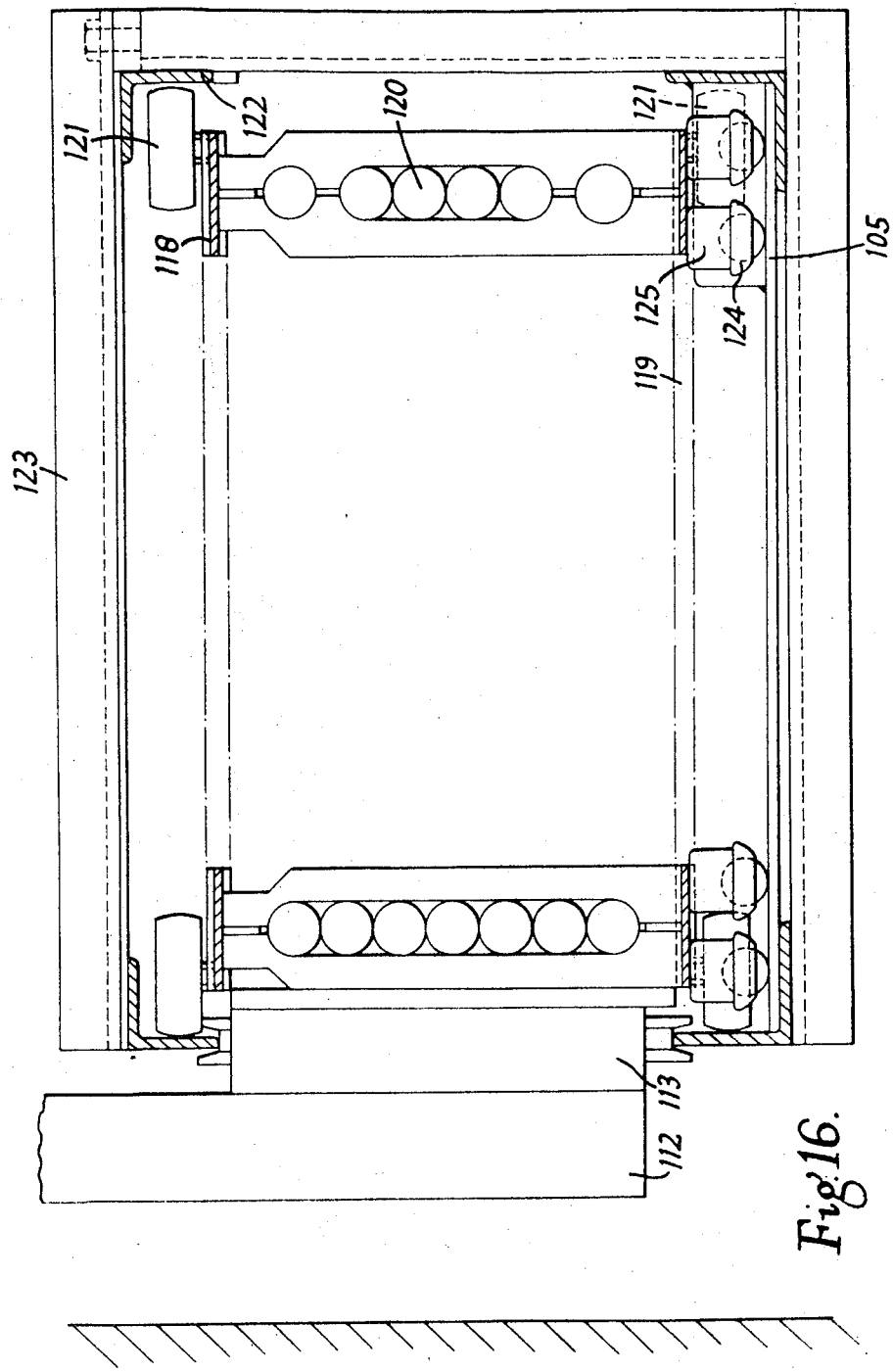
FIG. 16 is an enlargement of a detail of FIG. 15 showing the chain.

Reference is now made to FIGS. 14, 15 and 16. In the previously described embodiments the arcuate slots 28 in the single link plates are so located that the chain links are movable from a substantially in-line position to an inclined position in one side only of such relative in-line location. However, by extending the length of the arcs, the degree of relative pivotable movement of the links may be varied. One such application of an arrangement wherein the links are pivotable to a small amount from the in-line position to a more substantial amount in the other direction, is shown in FIGS. 14 to 16. These figures show a detail of a sugar-beet refining plant. This includes an annular carrier 105 and a plurality of elongated radially extending arms 106 which rotate together with the carrier 105 at a very slow angular velocity (requiring, for example, up to seven days to rotate through 360°) and serving to spray liquid on to beets within the sugar-beet container. This arrangement comprises a central fixed tower 107 about which the annular carrier 105 and the arms 106 rotate. The tower 107 carries a platform 108 forming a track for rollers 109 carried by the arms 106, and up the center of the tower extend supply pipes, hoses or cables 111. These cables 111 pass through the wall of the tower 105 and enter into a fixed socket device 112. Releasably engaged with the socket device 112 is a plug member 113. Both the socket device 112 and plug member 113 include stop valves so that when the devices 112 and 113 are disengaged, the valves are closed.

The plug member 113 is attached to a double-loop 114 and 115 leading to a take-off point 116 fixed on the annular carrier 105. Also fixed on this annular carrier 105 is a base plate 117 on which the castors of the chain loops 114 and 115 rest (see FIG. 16). As a substantial quantity of liquid is to be supplied to the arms, a large number of flexible supply pipes or cables 120 (six in this embodiment) are supported by the enlarged pipe supports 91 of the drag chain 114, 115 both upper and lower chain sets 118, 119 being provided. Both chain sets 118, 119 are provided with guide rollers 121 rotatable about vertical axes to abut against a flange on the carrier 105 and a flange 122 on an overhead cover 123. The arcuate slots in the single plate links of the chains 114 and 115 are of such dimensions that the chain can be bent in one direction through an arc having a minimum diameter equal to the radial dimension of the base plate 105 and in the other direction through an arc having a radius slightly greater than the radius of the inner periphery on the carrier 105. By having the chain in two sections 114 and 115, twice the number of flexible pipes 120 can be carried from one or more fixed sockets 112 to the rotating box 116 from whence the pipes are connected to spray heads in the arms 106. As the arms 106 rotate at a slow rate, it is possible, after a specified time, say every six days, for a workman to unplug the member 113 from the fixed socket or sockets 112 and physically to move the chain 114, 115 through approximately 300° and then re-engage the members 113 and 112 so that rotation of the arms 106 may continue in a substantially uninterrupted manner. As in the previously described embodiment, means are provided to hold the links in position in one of their operative positions. In this arrangement, pairs of plates 124 are provided adjacent the outer periphery of the base plate 105. The castors 125 of the lower runs of the chain 114, 115 which lie alongside the outer periphery are received between these pairs of plates 124 to hold them in position as the arms 106 rotate. The plates 124 serve to prevent the chain from "buckling" when it is being pushed during rotation of the arms.

This invention is not limited to the precise constructional details hereinbefore described. For example, the radius of the chain bend can be altered quite simply for any particular application by altering the length of the radial slots in manufacture. In chains for unusually heavy duty three or more chain sets may be provided with intermediate chain sets located between the upper and lower chain sets to give stability to elongated cable supports.

I claim:

1. A drag chain with means for supporting at least one flexible element extending from a fixed position to a member movable along a predetermined path, said drag chain having at least one chain set comprising a series of double plate links each constituted by two link plates secured together in spaced parallel relation and having first abutment means, said double plate links having end facing surfaces and alternating with a series of single plate links each having single link plates with corresponding facing surfaces and having their ends pivoted between the ends of the link plates of the double plate links and having second abutment means which cooperate with the first abutment means to limit the extent of relative pivotal movement of the links, with each pivotal connection comprising a ball received in an apertured end of the single plate link and engaged in cooperating recesses provided in the respective two link plates of the double plate link.

2. A drag chain as defined in claim 1, wherein the first abutment means comprise a pair of stop pins spaced on opposite sides of the pivotal connection extending between and securing the two link plates of the double plate link in spaced parallel relation and each of said single link plates comprises further arcuate apertures at opposite sides of each pivotal connection through which said stop pins extend and the arcuate limits of said further apertures relative to the pivotal connection comprise the second abutment means.

3. A drag chain as defined in claim 2 wherein said further apertures are formed in the single link plates as segments of annular slots concentric with the first mentioned aperture for said ball.

4. A drag chain as defined in claim 1 further including an anti-friction pressure pad located between each pair of facing surfaces of the respective link plates of the chain links.

5. A drag chain as defined in claim 4 wherein the pressure pads are of nylon material containing lubricant additives.

6. A drag chain as defined in claim 4 wherein each pressure pad has a central aperture to accommodate the pivotal connection, the diameter of the central aperture being less than the diameter of the ball.

7. A drag chain as defined in claim 1 wherein the ends of the links are arcuate, centered on the pivot axis, and of a radius equal to half the width of the links.

8. A drag chain as defined in claim 1 wherein said chain is a "horizontal" chain and the chain set includes a lower chain mounted on castors or balls.

9. A drag chain as defined in claim 8 wherein said castors or balls are movable over supporting means comprising a fixed base plate and a track coextensive with and movable relative to the base plate.

10. A drag chain as defined in claim 9 further including locating plates provided on the track to engage between the castors or balls.

11. A drag chain as defined in claim 1 wherein said chain is a "horizontal" chain which carries guide rollers rotatable about vertical axes.

12. A combination including a pair of drag chains as defined in claim 1, said chains having means for carrying a plurality of flexible elements extending from the fixed position to a movable take-off point.

13. A combination as defined in claim 12 wherein the flexible elements are connected to at least one socket member at the fixed position by disengageable plug means so that the flexible elements may be temporarily disconnected.

References Cited

UNITED STATES PATENTS

| 2,884,116 | 4/1959 | Leach | 59—78 |
| 2,975,807 | 3/1961 | Waninger | 248—49 |
| 3,157,376 | 11/1964 | Merker | 248—49 |
| 3,448,953 | 6/1969 | Kurlandsky | 248—51 |
| 3,448,954 | 6/1969 | Kurlandsky | 248—51 |

FOREIGN PATENTS

| 1,460,204 | 10/1966 | France. | |

CHARLES W. LANHAM, Primary Examiner

G. P. CROSBY, Assistant Examiner

U.S. Cl. X.R.

198—189; 248—49